(12) United States Patent
Watkins et al.

(10) Patent No.: US 7,685,807 B2
(45) Date of Patent: Mar. 30, 2010

(54) THREE COMPONENT INJECTOR FOR KEROSENE-OXYGEN ROCKET ENGINE

(75) Inventors: William B. Watkins, Tequesta, FL (US); Robert B. Fowler, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 443 days.

(21) Appl. No.: 11/516,417

(22) Filed: Sep. 6, 2006

(65) Prior Publication Data

US 2008/0053063 A1    Mar. 6, 2008

(51) Int. Cl.
   *F02K 9/42* (2006.01)
(52) U.S. Cl. .......................... 60/258; 60/740
(58) Field of Classification Search ................... 60/257, 60/258, 740, 742
   See application file for complete search history.

(56) References Cited

U.S. PATENT DOCUMENTS

| | | | |
|---|---|---|---|
| 3,541,788 A * | 11/1970 | Schutz | 60/39.094 |
| 3,662,960 A | 5/1972 | Mitchell, et al. | |
| 4,100,733 A | 7/1978 | Striebel et al. | |
| 5,054,287 A * | 10/1991 | Schneider | 60/240 |
| 5,151,171 A | 9/1992 | Spadaccini et al. | |
| 5,165,224 A | 11/1992 | Spadaccini et al. | |
| 5,176,814 A | 1/1993 | Spadaccini et al. | |
| 5,207,053 A | 5/1993 | Spadaccini et al. | |
| 5,232,672 A | 8/1993 | Spadaccini et al. | |
| 5,392,595 A | 2/1995 | Glickstein et al. | |
| 5,414,992 A | 5/1995 | Glickstein | |
| 6,470,670 B2 * | 10/2002 | Maeding | 60/259 |
| 7,389,636 B2 * | 6/2008 | Fowler et al. | 60/204 |
| 2004/0107692 A1 * | 6/2004 | Horn et al. | 60/258 |

FOREIGN PATENT DOCUMENTS

EP        0 854 278 A2     7/1998

* cited by examiner

*Primary Examiner*—Louis J Casaregola
(74) *Attorney, Agent, or Firm*—Kinney & Lange, P.A.

(57) ABSTRACT

A rocket engine system includes a combustion chamber defining a centerline axis, an oxidizer supply, a first fuel delivery circuit connected to a fuel supply, a second fuel delivery circuit connected to the fuel supply, and an injector assembly positioned at the combustion chamber. The injector assembly includes a faceplate having a plurality of openings therethrough, a first injector element connected to the first fuel delivery circuit and extending into one of the openings in the faceplate, and a second injector element connected to the second fuel delivery circuit and extending into another of the openings in the faceplate. Annular oxidizer outlets are formed at the openings in the faceplate and connected to the oxidizer supply to deliver oxidizer to the combustion chamber.

19 Claims, 4 Drawing Sheets

THREE COMPONENT INJECTOR FOR KEROSENE-OXYGEN ROCKET ENGINE

BACKGROUND OF THE INVENTION

The present invention relates to fluidic injection systems for use with rocket engines, and more particularly to an injector assembly for injecting a three-part propellant mixture for use with a rocket engine.

Rocket engines can utilize different types of propellants. Liquid propellants are desirable because they generally have a higher specific impulse than solid propellants. Among liquid propellants, hydrogen-oxygen propellants represent a benchmark for providing a desirable specific impulse. However, there are operational drawbacks to the use of such propellant mixtures, primarily because liquid hydrogen is a difficult fuel to deal with in terms of storage, delivery, etc. Kerosene is seen as a suitable alternative to hydrogen as a rocket fuel for use with an oxygen oxidizer.

Kerosene-oxygen rocket engines present problems in two distinct areas for rocket engine operation: combustion efficiency and combustion stability. Combustion efficiency generally refers to the completeness of the burning of propellants during engine operation. A problem faced with kerosene-oxygen rocket engines is that some kerosene typically exits an exhaust nozzle of the rocket engine without being burned, which lowers combustion efficiency in producing engine thrust. It is desired to achieve a relatively high level of combustion efficiency. It is also generally desired to maintain a stable combustion process, and to increase the stability of kerosene-oxygen rocket engine combustion processes. Combustion stability can be particularly problematic with kerosene rocket propellants, and undesired effects like oscillations in pressure can be produced.

BRIEF SUMMARY OF THE INVENTION

A rocket engine system includes a combustion chamber defining a centerline axis, an oxidizer supply, a first fuel delivery circuit connected to a fuel supply, a second fuel delivery circuit connected to the fuel supply, a faceplate having a plurality of openings therethrough, and an injector assembly positioned at the combustion chamber. The injector assembly includes a first injector element connected to the first fuel delivery circuit and extending into one of the openings in the faceplate, and a second injector element connected to the second fuel delivery circuit and extending into another of the openings in the faceplate. Annular oxidizer outlets are formed at the openings in the faceplate and connected to the oxidizer supply to deliver oxidizer to the combustion chamber.

DETAILED DESCRIPTION

The present invention generally relates to an injector assembly for use with a rocket engine system. The injector assembly is used with propellant mixtures of kerosene-type fuels and a gaseous oxygen (or GO2) oxidizer. As explained in greater detail below, the kerosene-type fuel is provided in two distinct parts, with one part being the kerosene-type fuel in a liquid state and another part being the kerosene-type fuel in a supercritical and/or endothermically converted state. The injector assembly delivers a three part propellant mixture, including the two fuel parts and a third oxidizer part, along separate and distinct injection circuits (or paths) to a main combustion chamber where the propellants are mixed and burned to generate thrust. Use of the injector assembly in a rocket engine helps promote combustion stability and combustion efficiency when utilizing a kerosene-type fuel that has been converted, as least partially to a gas or gas-like state. Because inadequate heat is typically available in a given engine to convert all fuel to a supercritical and/or endothermically converted state, the use of two separate fuel injection circuits allows fuel in one injection circuit to undergo conversion to a gas or gas-like form while the fuel in the other circuit can remain in a liquid form.

Figure 1:
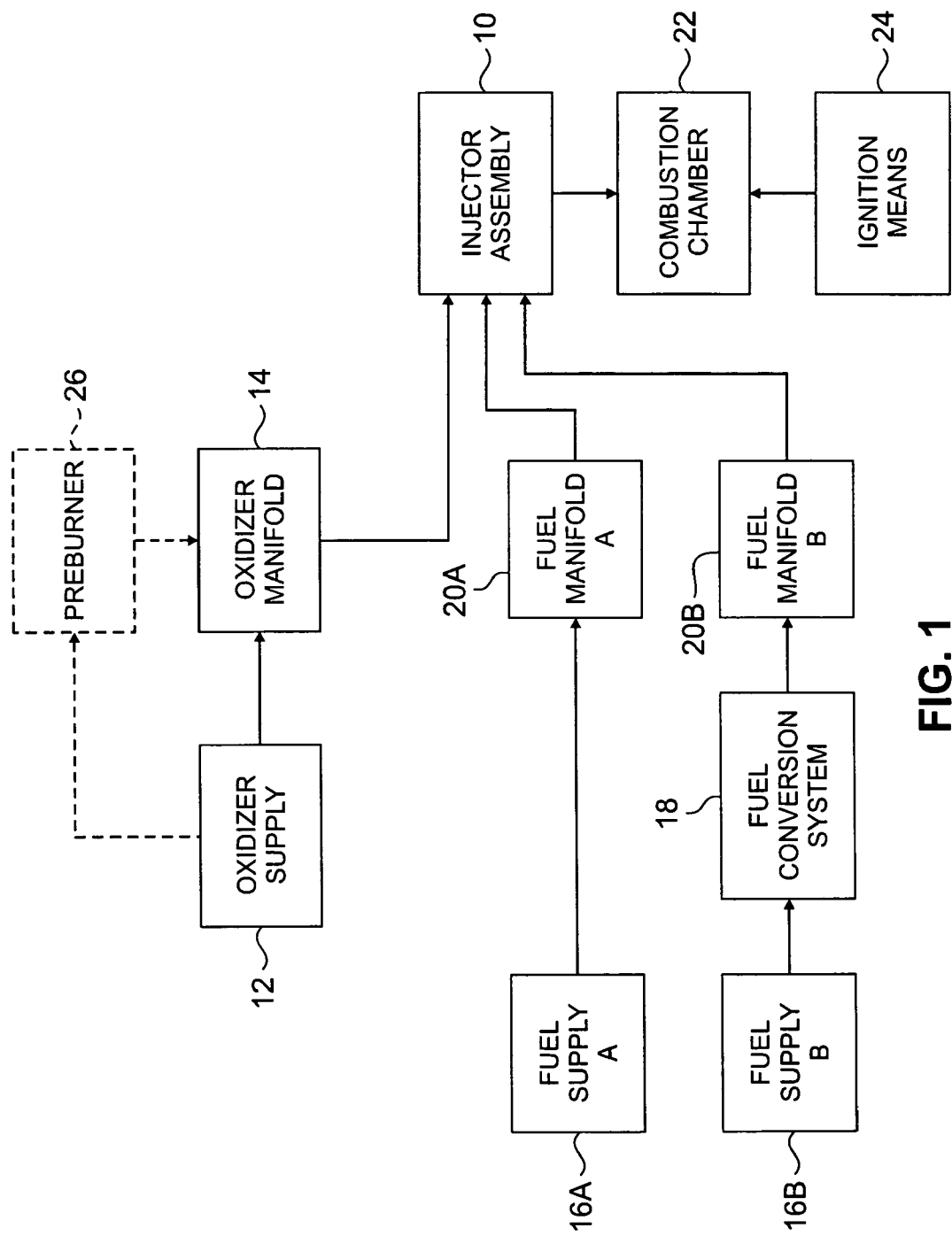
FIG. 1 is a block diagram of a rocket engine system having a three-part injector assembly.

FIG. 1 is a block diagram of a rocket engine system having a three-part injector assembly 10. The system includes an oxidizer supply 12, an oxidizer dome (or manifold) 14, fuel supplies "A" and "B" (designated by reference numbers 16A and 16B, respectively), a fuel conversion system 18, and fuel manifolds "A" and "B" (designated by reference numbers 20A and 20B, respectively). The system further includes a combustion chamber 22, an ignition means 24, and can optionally include a preburner 26.

The oxidizer supply 12 delivers an oxidizer from a storage location (not shown). The oxidizer can optionally be routed to the oxidizer-rich preburner 26, which can be a conventional preburner that generates a gaseous oxygen (or GO2) product for use as the oxidizer for the main combustion process. Alternatively, the oxidizer supply 12 can provide gaseous oxygen directly. From the oxidizer supply 12 or the preburner 26, oxidizer is routed to the oxidizer dome 14, which distributes oxidizer to the injector assembly 10.

The fuel supply "A" 16A delivers fuel from a storage location (not shown) to the fuel manifold "A" 20A, which in turn distributes fuel to the injector assembly 10. Fuel from fuel supply "A" 16A is delivered to the combustion chamber 22 along a fuel circuit "A", and utilizes a kerosene-type hydrocarbon fuel in liquid form. The fuel supply "A" 16A can include a fuel cooling circuit, which can add heat to the fuel while the fuel remains substantially in a liquid form. It should be understood that this kerosene-type fuel can be nearly any type of conventional kerosene rocket fuel or kerosene-like hydrocarbon fuel as desired for particular applications.

The fuel supply "B" 16B delivers fuel from a storage location (not shown), which can be the same fuel storage location from which the fuel supply "A" 16A obtains fuel or a different location, to the fuel conversion system 18. The fuel conversion system 18 then delivers "converted" fuel to the fuel manifold "B" 20B, which distributes fuel to the injector assembly 10. Fuel travels between the fuel supply "B" 16B to the combustion chamber 22 along a fuel circuit "B", which is separate and distinct from the fuel circuit "A" described above.

The fuel supply "B" 16B delivers a kerosene-type hydrocarbon fuel in liquid form to the fuel conversion system 18. The fuel conversion system 18 then converts or "cracks" the kerosene-type fuel through an endothermic process to produce a converted fuel that is in a supercritical and/or endothermically converted state. The fuel conversion system 18 can convert fuel through a known endothermic conversion process. For example, the fuel can be routed through a cooling circuit, which can include passages in the walls of the combustion chamber 22. Heat from the combustion chamber 22 is added to the fuel as it passes through the cooling circuit of the fuel conversion system 18. A thin layer of an endothermic decomposition catalyst (e.g., similar to that described in U.S. Pat Nos. 5,232,672 and 5,207,053) can be located along fuel lines of the fuel conversion system 18 in order to promote conversion of the fuel. "Converted" fuel is in a supercritical and/or endothermically converted state. Kerosene-type fuels reach a supercritical state at conditions above approximately 2,413 kPa (350 psi) in pressure and approximately 427° C. (800° F.) in temperature, where physical properties of the fuel change such that the liquid meniscus disappears and the fuel behaves much like a gas. At temperatures above approximately 538° C. (1,000° F.), kerosene-type fuels undergo chemical changes into simpler, lighter molecular weight hydrocarbons. Depending upon the specific conditions of a particular application, such as the amount of heat available from the combustion chamber 22 to convert the fuel, the particular characteristics of the conversion process can vary. For instance, the fuel conversion system 18 will convert some of the fuel to a supercritical state and the rest will be endothermically converted. The particular percentage of fuel converted to the supercritical state versus an endothermically converted state can vary for different applications. However, in all cases, substantially all of the converted fuel generally behaves like a gas.

It should be noted that the operation of the fuel conversion system 18 of the overall engine system is described with respect to endothermic conversion during steady-state engine operation after the startup transient is complete. The provision of heat for fuel conversion during the startup transient may require special design considerations, such as auxiliary heat sources.

Oxidizer, the converted fuel and the unconverted fuel are delivered by the injector assembly 10 to the combustion chamber where those propellants mix and are ignited by the ignition means 24. The ignition means 24 can be a chemical ignition system (e.g., a known hypergolic ignition system), an electrical ignition system (e.g., a known spark ignition system), or other suitable system for initiating combustion in the combustion chamber 22.

Figure 2:
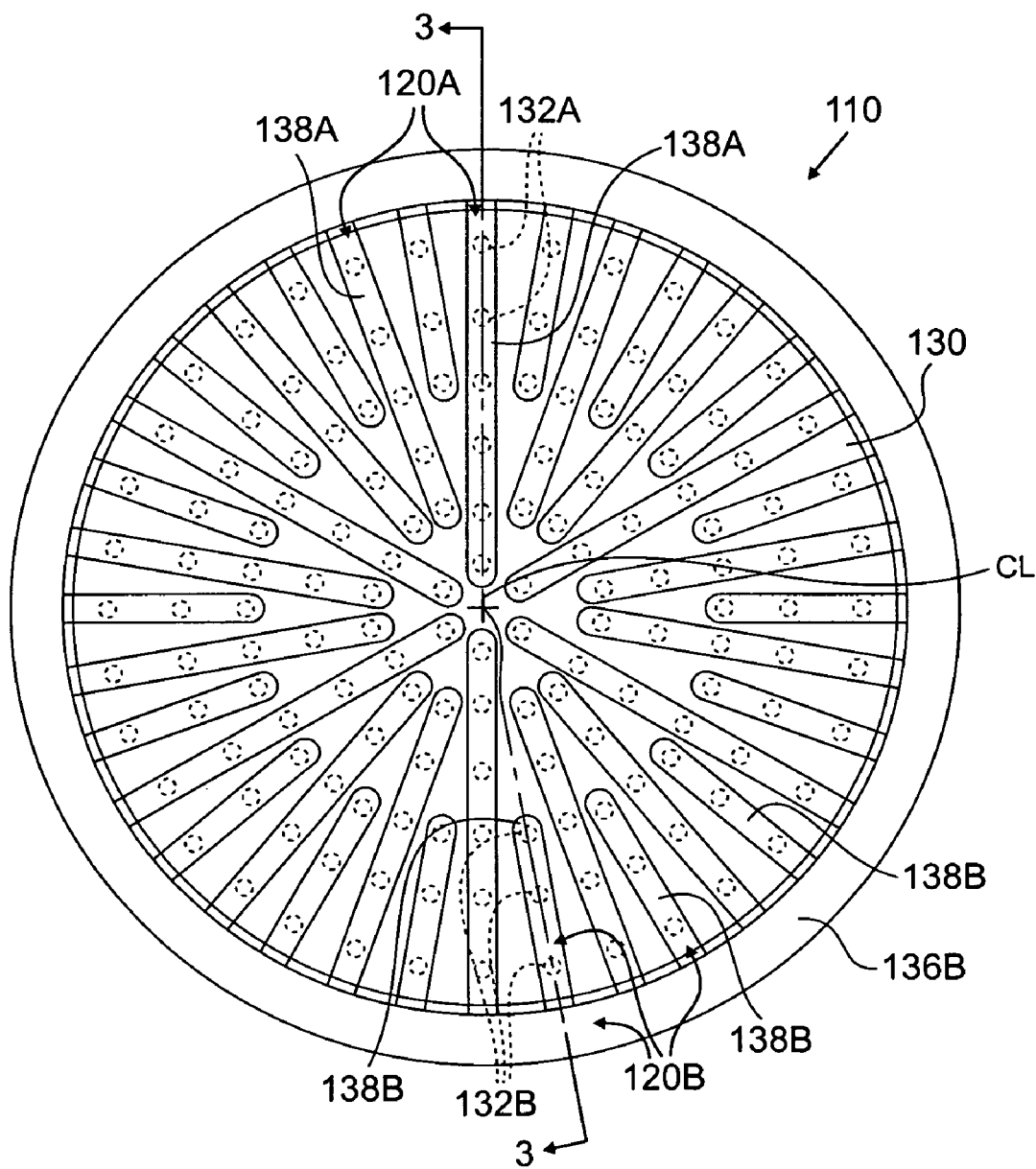
FIG. 2 is a front view of the injector assembly of FIG. 1.
Figure 3:
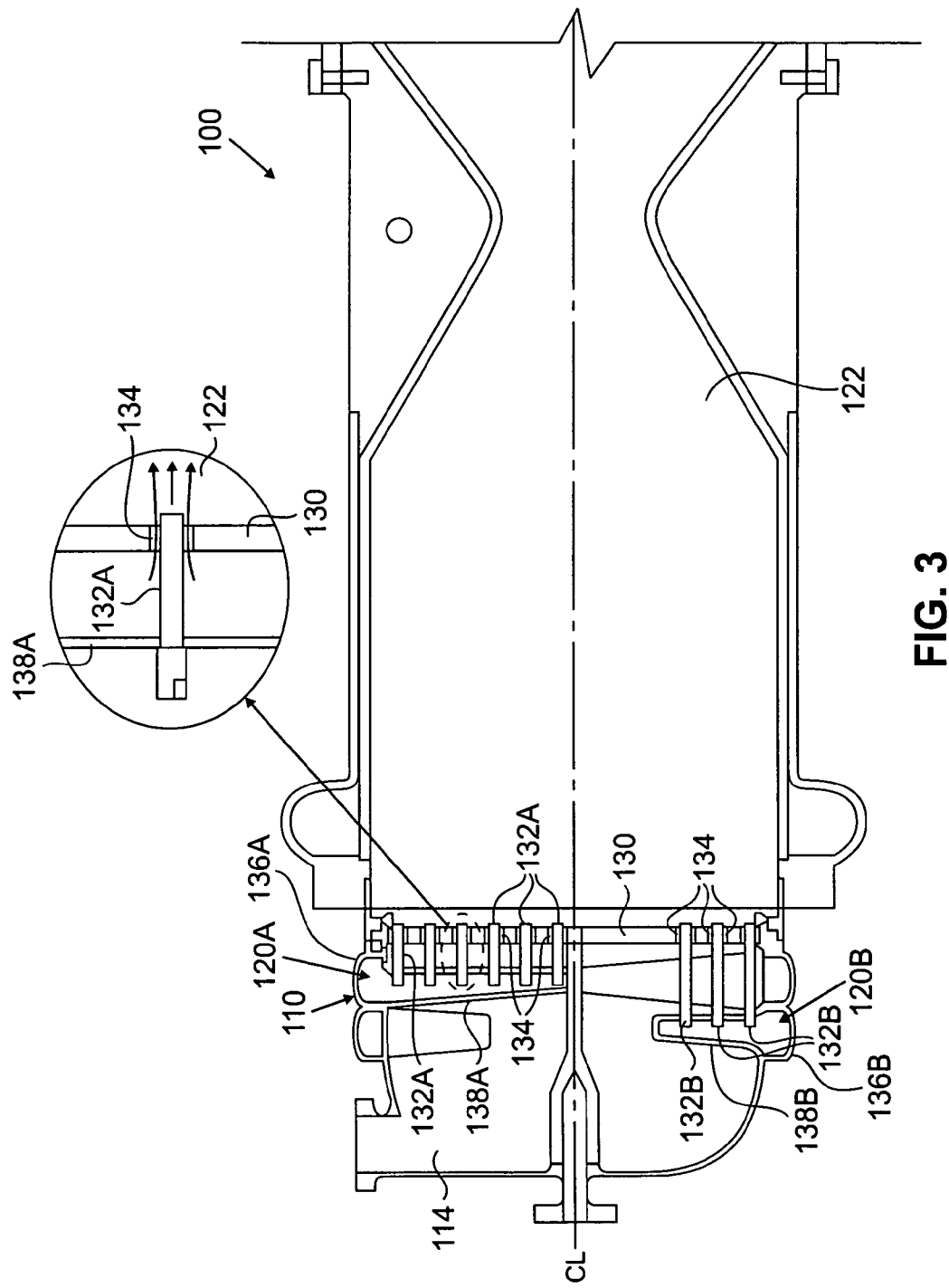
FIG. 3 is a schematic cross-sectional view of a rocket engine having a three-part injector assembly, taken along line 3-3 of FIG. 2.

FIG. 2 is a front view of an injector assembly 110. FIG. 3 is a schematic cross-sectional view of a rocket engine 100 having the injector assembly 110, taken along line 3-3 of FIG. 2. The rocket engine 100 includes an oxidizer dome 114, two sets of fuel manifolds 120A and 120B, and a combustion chamber 122. The engine 100 can be used in conjunction with a rocket engine system similar to that described above with respect to FIG. 1.

As shown in FIG. 3, the combustion chamber 122 is a conventional converging-diverging combustion chamber with walls having cooling circuit passageways therein. The combustion chamber 122 is aligned along an engine centerline axis CL.

The injector assembly 110 is positioned at a forward end of the combustion chamber 122. The injector assembly 110 includes an injector faceplate 130 and first and second sets of injector elements 132A and 132B, respectively. The injector faceplate 130 is a generally disc-shaped structure that includes generally circular openings 134 into which distal ends of each of the two sets of injector elements 132A and 132B are positioned coaxially (with respect to each opening 134), and can be made of a porous web of metallic material (e.g., Rigimesh® media available from Pall Corp., Ann Arbor, Me.). The openings 134 can be machined into the material of the faceplate 130. FIG. 3 includes an enlarged representation of a portion of injector assembly 110, showing one of the injector elements 132A extending through one of the openings 134 in the faceplate 130 with arrows schematically representing propellant flow paths into the combustion chamber 122.

The oxidizer dome 114 routes oxidizer from a supply (not shown, but see FIG. 1) to the combustion chamber 122. Oxidizer can move past the fuel manifolds 120A and 120B and then through annular gaps formed between each of the injector elements 132A and 132B and each opening 134 in the faceplate 130. The size of the annular gaps is determined based upon a predetermined amount of oxidizer flow desired at the propellant feed system temperature and pressure. In the illustrated embodiment, the material of the faceplate 130 is porous, and the oxidizer can pass into and through those pores to help cool the faceplate 130.

The fuel manifolds 120A and 120B are axially offset. In the illustrated embodiment, the fuel manifold 120B is positioned axially forward of the fuel manifold 120A, which facilitates mechanically integrating the two manifolds into the injector assembly 110, although in alternative embodiments other arrangements are possible. Each fuel manifold 120A and 120B includes a radially outer ring portion 136A and 136B, respectively, and a set of radially inwardly extending arms 138A and 138B, respectively. The arms 138A and 138B are cantilevered from the ring portions 136A and 136B, respectively, which are secured relative to the combustion chamber 122. The injector elements 132A extend aft from the arms 138A of the fuel manifold 120A, and the injector elements 132B extend aft from the arms 138B of the fuel manifold 120B. It should be noted that in the illustrated embodiment the injector elements 132B have a slightly longer axial length than the injector elements 132A, which is a result of the fuel manifold 120B from which the injector elements 132B extend being positioned more axially forward from the injector faceplate 130 than the fuel manifold 120A from which the injector elements 132A extend. Fuel can pass from the ring portions 136A and 136B to the arms 138A and 138B, respectively, and then to the injector elements 132A and 132B, respectively.

As shown in FIG. 2, the arms 138A of the fuel manifold 120A and the arms 138B of the fuel manifold 120B are arranged such that the injector elements 132A and 132B are dispersed across the injector faceplate 130 such that propellants are distributed relatively evenly into the combustion chamber 122. Moreover, the arms 138A and their respective injector elements 132A are interspersed azimuthally across the faceplate 130 with the arms 138B and their respective injector elements 132B. Interspersing the arms 138A and 138B includes alternating or staggering the positioning of the arms 138A and 138B about the centerline CL, which can include arranging the injector assembly 110 such that the arms 138B of the fuel manifold 120B alternate with the arms 138A of the fuel manifold 120A about the circumference of the injector assembly 110. Interspersing the injector elements 132A and 132B facilitates more even distribution of fuels from the fuel manifold 120A and the fuel manifold 120B in the combustion chamber 122. Furthermore, the alternating or staggering of the arms 138A and 138B of the fuel manifolds 120A and 120B, respectively, helps discourage fuels from burning in the combustion chamber 122 all in substantially the same plane (defined perpendicular to the centerline CL).

Figure 4:
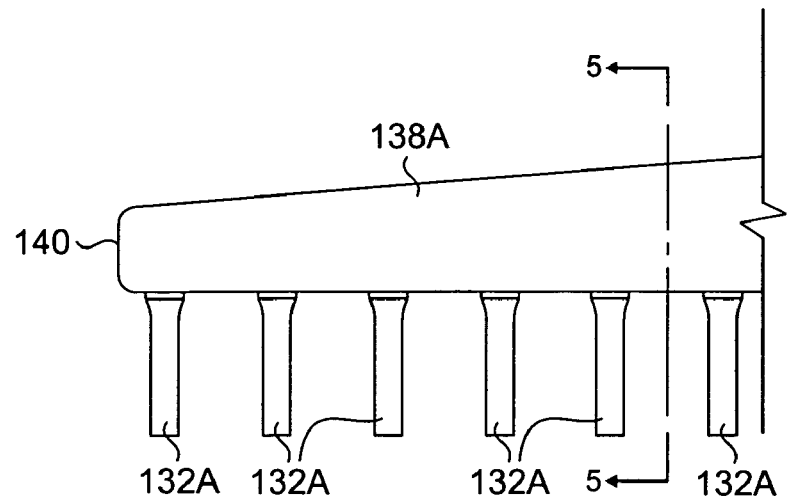
FIG. 4 is a side view of a portion of the injector assembly of FIGS. 2 and 3.
Figure 5:
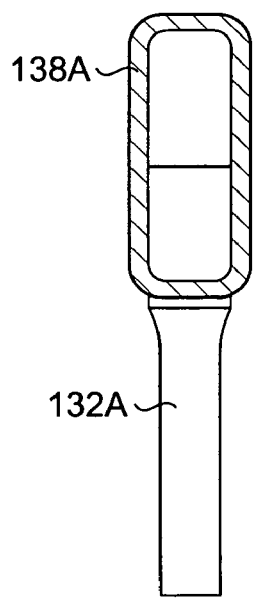
FIG. 5 is a cross-sectional view of the portion of the injector assembly, taken along line 5-5 of FIG. 4.
Figure 6:
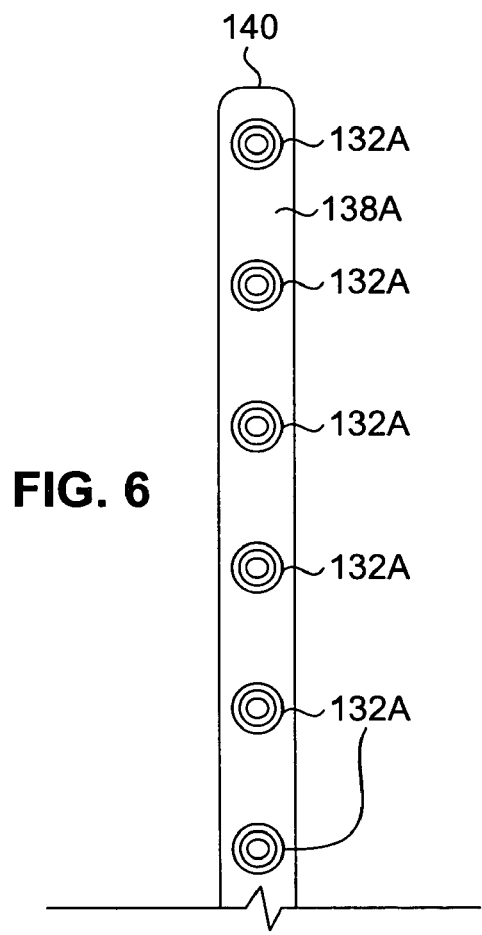
FIG. 6 is a rear view of the portion of the injector assembly shown in FIGS. 4 and 5.

Additional details of the injector assembly 110 components are shown in FIGS. 4-6. FIG. 4 is a side view of a portion of the injector assembly 110, showing one arm 138A of the fuel manifold 120A and a number of the injector elements 132A extending therefrom. FIG. 5 is a cross-sectional view of a portion of the injector assembly 110, taken along line 5-5 of FIG. 4, and FIG. 6 is a rear or aft view of the portion of the injector assembly 110 shown in FIG. 4. As shown in FIGS. 2 and 4, the arm 138A is configured to taper to a smaller cross-sectional area at an inner diameter end 140 than near the ring portion 136A, which facilitates maintaining fuel flow to all of the injector elements 132A supplied with fuel by the fuel manifold 120A. As shown in FIG. 5, the arm 138A has a generally rectangular tube shape.

Each injector element 132A and 132B is of a tubular configuration similar to known coaxial injector element configurations. The injector elements 132A and 132B can be either swirl-type elements or shear-type elements (without swirl). As explained further below, the injector elements 132A and 132B deliver fuel to the combustion chamber 122 that mixes with oxidizer supplied through the annular gaps formed between each injector element 132A and 132B and the respective openings 134 in the faceplate 130.

Other arms 138A and 138B of the injector assembly 110 are generally similar to the arm 138A shown in FIGS. 4-6. However, as shown in FIG. 2, the lengths of the injector elements 132A and 132B can be different, and as shown in in FIG. 3, the lengths of the arms 138A and 138B can vary. As a result of the varying lengths of the arms 138A and 138, different numbers of injector elements 132A and 132B, respectively, extend from them. In the illustrated embodiment, between three and six injector elements 132A and 132B extend from each arm 138A and 138B, respectively. It should be noted that the total number of injector elements 132A and 132B in the injector assembly 110 can vary as desired for a particular application. For example, large rocket engines will typically have more injector elements than smaller engines. Furthermore, the overall ratio of the number of injector elements 132A as compared to the number of injector elements 132B will be determined by the desired mass fraction of the fuels (or fuel supplies) delivered to the combustion chamber 122 via each fuel manifold 120A and 120B.

In operation, the engine 100 generally operates as follows. An oxidizer, typically gaseous oxygen, is delivered to the oxidizer dome 114. A liquid hydrocarbon fuel, typically a kerosene-type fuel, constitutes a first fuel part that is delivered along a first fuel supply circuit (or path) through the fuel manifold 120A (see FIG. 1). The same kind of liquid hydrocarbon fuel (e.g., a kerosene-type fuel) is converted to a supercritical and/or endothermically converted state and the converted fuel represents a second fuel part (see FIG. 1). The converted fuel is delivered along a second fuel supply circuit (or path) through the fuel manifold 120B. Injector elements 132A and 132B deliver the two fuel parts from two fuel deliver circuits corresponding to the two fuel manifolds 120A and 120B, respectively, to the combustion chamber 122. Oxidizer flows from the oxidizer dome 114 to the combustion chamber 122 past the fuel manifolds 120A and 120B and through the annular gaps formed between each injector element 132A and 132B and the respective openings 134 in the faceplate 130. The oxidizer from the oxidizer dome 114 bathes the components of the injector assembly 110 forward (i.e., upstream) of the faceplate 130, which helps provide heat to keep the fuel in the second fuel supply circuit in a supercritical and/or endothermically converted state prior to combustion. The three propellants, including the oxidizer and the two fuel parts, are mixed and burned in the combustion chamber 122 to generate thrust.

The use of a fuel in a supercritical and/or endothermically converted state helps to promote combustion efficiency and combustion stability. The injector assembly of the present invention permits the use of a split or two-part fuel delivery circuit, which in a practical sense enables an injection of a gas-like hydrocarbon fuel to a combustion chamber for combustion. By keeping the fuels carried by the respective fuel manifolds 120A and 120B separate before delivery to the combustion chamber, the fuels can remain in their respective thermodynamic states, and in particular, the supercritical/endothermic fuel cannot mix with conventional fuel and thereby lose its unique characteristics.

Although the present invention has been described with reference to preferred embodiments, workers skilled in the art will recognize that changes may be made in form and detail without departing from the spirit and scope of the invention. For instance, the various components of a rocket engine system with an injector assembly according to the present invention can have different shapes, configurations and arrangements other than the particular embodiments shown and describes herein. The embodiments disclosed are provided merely by way of example, and not by way of limitation.

What is claimed is:

1. An injector assembly for a rocket engine, the injector assembly comprising:
   a faceplate positioned adjacent to a combustion chamber that defines an engine centerline;
   a first set of holes defined in the faceplate;
   a first set of injector elements, wherein the first set of injector elements is arranged to correspond with the first set of holes defined in the faceplate such that each injector element is positioned to extend into one of the first set of holes, and wherein an annular fluid outlet is formed between each injector element and each hole in the faceplate for delivering a first fluid to the combustion chamber;
   a first injector manifold, wherein each injector of the first set of injector elements is connected in fluid communication with the first injector manifold for delivering a second fluid to the combustion chamber;
   a second set of holes defined in the faceplate;
   a second set of injector elements, wherein the second set of injector elements is arranged to correspond with the second set of holes defined in the faceplate such that each injector element is positioned to extend into one of the second set of holes, and wherein an annular fluid outlet is formed between each injector element and each hole in the faceplate for delivering the first fluid to the combustion chamber; and
   a second injector manifold, wherein each injector of the second set of injector elements is connected in fluid communication with the second injector manifold for delivering a third fluid to the combustion chamber.

2. The assembly of claim 1, wherein the first and second injector manifolds each comprise a radially disposed manifold arm 3. The assembly of claim 2, wherein the manifold arm of the first injector manifold is axially offset from the manifold arm of the second injector assembly.

4. The assembly of claim 1, wherein the first fluid is an oxidizer.

5. The assembly of claim 4, wherein the oxidizer comprises gaseous oxygen.

6. The assembly of claim 1, wherein the second fluid is a fuel in liquid state.

7. The assembly of claim 6, wherein the third fluid comprises the fuel in a supercritical state.

8. The assembly of claim 6, wherein the third fluid comprises the fuel in an endothermically converted state.

9. The assembly of claim 6, wherein the fuel comprises kerosene.

10. The assembly of claim 1, wherein each injector element of the first set has a length L1 and each injector element of the second set has a length L2, and wherein L1 is not equal to L2.

11. The assembly of claim 1, wherein the first set of injector elements is interspersed azimuthally with the second set of injector elements.

12. The assembly of claim 1, wherein the faceplate comprises a porous web of material.

13. A rocket engine system comprising:
a combustion chamber defining a centerline axis;
an oxidizer supply;
a first fuel delivery circuit connected to a fuel supply;
a second fuel delivery circuit connected to the fuel supply;
an injector assembly positioned at the combustion chamber, the injector assembly comprising:
a faceplate having a plurality of openings therethrough;
a first injector element connected to the first fuel delivery circuit and extending into one of the openings in the faceplate; and
a second injector element connected to the second fuel delivery circuit and extending into another of the openings in the faceplate;
annular oxidizer outlets formed at the openings in the faceplate and connected to the oxidizer supply to deliver oxidizer to the combustion chamber; and
a fuel conversion subsystem integrated with the second fuel delivery circuit for changing a physical state of fuel such that converted fuel behaves like a gas.

14. The system of claim 13 and further comprising:
a first injector supply manifold connected between the first fuel delivery circuit and the first injector element;
a third injector element connected to the first injector supply manifold;
a second injector supply manifold connected between the second fuel delivery circuit and the second injector element; and
a fourth injector element connected to the second injector supply manifold.

15. The system of claim 13 and further comprising:
an oxygen-rich preburner, wherein the oxidizer from the oxidizer supply passes through the preburner to generate a gaseous oxygen oxidizer product for combustion in the combustion chamber.

16. The system of claim 13, wherein the faceplate comprises a web of porous metallic material.

17. The system of claim 13, wherein a plane is defined in the combustion chamber perpendicular to the centerline axis, and wherein the first injector element and the second injector element are arranged such that fuels delivered to the combustion chamber do not all burn in the plane.

18. The system of claim 13, wherein the oxidizer is gaseous oxygen.

19. A rocket engine system comprising:
a combustion chamber defining a centerline axis;
an oxidizer supply;
a first fuel delivery circuit connected to a fuel supply;
a second fuel delivery circuit connected to the fuel supply;
an injector assembly positioned at the combustion chamber, the injector assembly comprising:
a faceplate having a plurality of openings therethrough;
a first injector element connected to the first fuel delivery circuit and extending into one of the openings in the faceplate; and
a second injector element connected to the second fuel delivery circuit and extending into another of the openings in the faceplate;
annular oxidizer outlets formed at the openings in the faceplate and connected to the oxidizer supply to deliver oxidizer to the combustion chamber; and
a fuel conversion subsystem integrated with the second fuel delivery circuit for changing a physical state of fuel such that convened fuel behaves like a gas, wherein the first fuel delivery circuit delivers a hydrocarbon fuel in a liquid form to the combustion chamber, and wherein the second fuel delivery circuit delivers the hydrocarbon fuel at least partially in a supercritical state to the combustion chamber.

* * * * *

UNITED STATES PATENT AND TRADEMARK OFFICE
CERTIFICATE OF CORRECTION

Page 1 of 1

| | |
|---|---|
| PATENT NO. | : 7,685,807 B2 |
| APPLICATION NO. | : 11/516417 |
| DATED | : March 30, 2010 |
| INVENTOR(S) | : William B. Watkins and Robert B. Fowler |

It is certified that error appears in the above-identified patent and that said Letters Patent is hereby corrected as shown below:

Col. 8, line 37,
  delete "convened"
  insert --converted--

Signed and Sealed this
Twenty-first Day of June, 2011

David J. Kappos
*Director of the United States Patent and Trademark Office*